(12) United States Patent
Egami et al.

(10) Patent No.: US 6,269,290 B1
(45) Date of Patent: Jul. 31, 2001

(54) ENGINE-MOTOR HYBRID VEHICLE CONTROL APPARATUS AND METHOD HAVING ENGINE PERFORMANCE LESSENING COMPENSATION

(75) Inventors: Tsuneyuki Egami, Gamagori; Kazuyoshi Obayashi, Chita-gun; Hiroya Tsuji, Yokkaichi; Yasumasa Kaji; Keiichiro Banzai, both of Toyota; Takeshi Sawada, Chiryu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/343,474

(22) Filed: Jun. 30, 1999

(30) Foreign Application Priority Data

| Jul. 1, 1998 | (JP) | 10-186332 |
| Jul. 13, 1998 | (JP) | 10-197745 |
| Aug. 3, 1998 | (JP) | 10-219346 |

(51) Int. Cl.⁷ .................................................. B60L 11/00
(52) U.S. Cl. .............................. 701/22; 290/45; 310/266; 74/661
(58) Field of Search ........................ 701/22, 54; 180/65.2, 180/65.4; 290/45, 11; 310/266, 112, 113; 74/661

(56) References Cited

U.S. PATENT DOCUMENTS 5,402,046  3/1995  Jeanneret ........................ 318/139

6,081,042  * 6/1999  Tabata et al. ........................ 290/45

FOREIGN PATENT DOCUMENTS

| 800 951 | 10/1997 | (EP) . |
| 820 894 | 1/1998 | (EP) . |
| 7-203636 | 8/1995 | (JP) . |
| 8-79911 | 3/1996 | (JP) . |
| 8-340605 | 12/1996 | (JP) . |
| 9-135503 | 5/1997 | (JP) . |
| 10-94109 | 4/1998 | (JP) . |
| 11-6449 | 1/1999 | (JP) . |

\* cited by examiner

Primary Examiner—William A. Cuchlinski, Jr.
Assistant Examiner—Arthur D. Donnelly
(74) Attorney, Agent, or Firm—Pillsbury Madison & Sutro LLP

(57) ABSTRACT

In an engine-motor hybrid vehicle, vehicle drive regions are divided into a plurality of groups specified by a plurality of operation state variables. A learning variable set for each drive region is updated according to an amount of a power state of an engine, when the vehicle is in a steady state running. The learning variable indicates a change in the power state amount with age. When an engine power demand value is determined, it is corrected by using the learning variable of a selected drive region to calculate a corrected engine power demand value compensating a change in the engine with age. In this manner, the engine power is controlled.

26 Claims, 11 Drawing Sheets

ENGINE-MOTOR HYBRID VEHICLE CONTROL APPARATUS AND METHOD HAVING ENGINE PERFORMANCE LESSENING COMPENSATION

CROSS REFERENCE TO RELATED APPLICATION

This application relates to and incorporates herein by reference Japanese Patent Applications No. 10-186332, No. 10-197745 and No. 10-219346 filed on Jul. 1, 1998, Jul. 13, 1998 and Aug. 3, 1998, respectively.

BACKGROUND OF THE INVENTION

1. Field of the Invention

The present invention relates to a control apparatus and method for an engine-motor hybrid vehicle, and more particularly to a control apparatus and method which compensates for a lessening of an engine by learning.

2. Description of Related Art

An engine-motor hybrid vehicle, such as disclosed in EP 0800951A1 (JP-A-9-266601), has an internal combustion engine, a power transmission device including a rotary electric machine (electric motor) which converts a part of an engine power or the entirety thereof into an electric power to generate at least one part of the driving power of the vehicle, and an electricity storage device (storage battery) for supplying the electric power to the rotary electric machine and receiving it therefrom. The power transmission device is a two-motor type, which has a first rotary electric machine connected with an output shaft of the engine and determines the number of rotations of the engine, and a second rotary electric machine connected with an output shaft of a vehicle body and determines the driving force of the vehicle.

In this type of hybrid vehicle, it is necessary to control the engine by an electronic control unit the rotary electric machine, and the electricity storage device. Specifically, the electronic control unit calculates a vehicle driving torque demand value corresponding to a depression stroke of an accelerator pedal. Based on the number of rotations of the output shaft of the vehicle, the control unit also calculates a vehicle driving power demand value to be outputted to the drive shaft. The control apparatus also calculates an engine torque demand value corresponding to the vehicle driving power demand value and calculates an engine speed demand value corresponding thereto. Then, the control unit calculates an engine power demand value, based on the determined engine torque demand value and the determined engine speed demand value. To obtain a high degree of engine efficiency, the control unit determines an engine operation point on an engine performance characteristics curve which displays the engine power demand.

To operate the engine in a steady state at the engine operation point, a torque control is performed by a clutch motor connected with the engine to compensate the torque difference between the vehicle driving torque demand value and an engine torque by an assist motor.

The engine power is determined based on a value obtained by dividing the vehicle driving power by an efficiency of transmission of the engine power from the engine to the drive shaft of the vehicle to add a motor loss and an electricity storage device loss to the vehicle driving power demand value and the charge/discharge power demand value.

However, the engine performance characteristic changes and lessens because a fuel injection device is likely to clog and a cylinder bore and a ring are likely to wear during use. Further, the characteristic property of fuel serving as a material for generating the power energy of the internal combustion engine changes, depending on a season and a market. This also changes the performance of the engine. Furthermore, a similar problem occurs because the performance and characteristic of the power transmission device including the rotary electric machine and the electricity storage device change with age.

Thus, the most efficient engine operation point once determined as above is likely to deviate from an optimum one. Therefore, the vehicle driving power is dislocated from the vehicle driving power demand value or the electricity storage device is wastefully consumed.

SUMMARY OF THE INVENTION

It is therefore an object of the present invention to provide an electronic control apparatus for an engine-motor hybrid vehicle capable of obviating disadvantages which are brought about owing to changes in performance characteristics of various parts.

According to the present invention, a lessening of an engine performance from a maximum performance efficiency point is detected when a vehicle is under a steady state travel condition and an imbalance of charge and discharge of an electricity storage device is outside of a predetermined range. An engine control is changed based on a detection of lessening of the engine performance so that the engine may be operated at the maximum performance efficiency.

Preferably, an engine control correction value is calculated when the steady state travel and the lessening of engine performance are detected, and the engine is controlled based on predetermined control parameters including the calculated engine control correction value thereby to operate the engine at the maximum performance efficiency point. The engine control correction value is updated by learning to reduce the imbalance of charge and discharge of the storage electricity storage device.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENTS

Preferred embodiments of an electronic control apparatus for an engine-motor hybrid vehicle will be described below with reference to accompanied drawings.

First Embodiment

Figure 1:
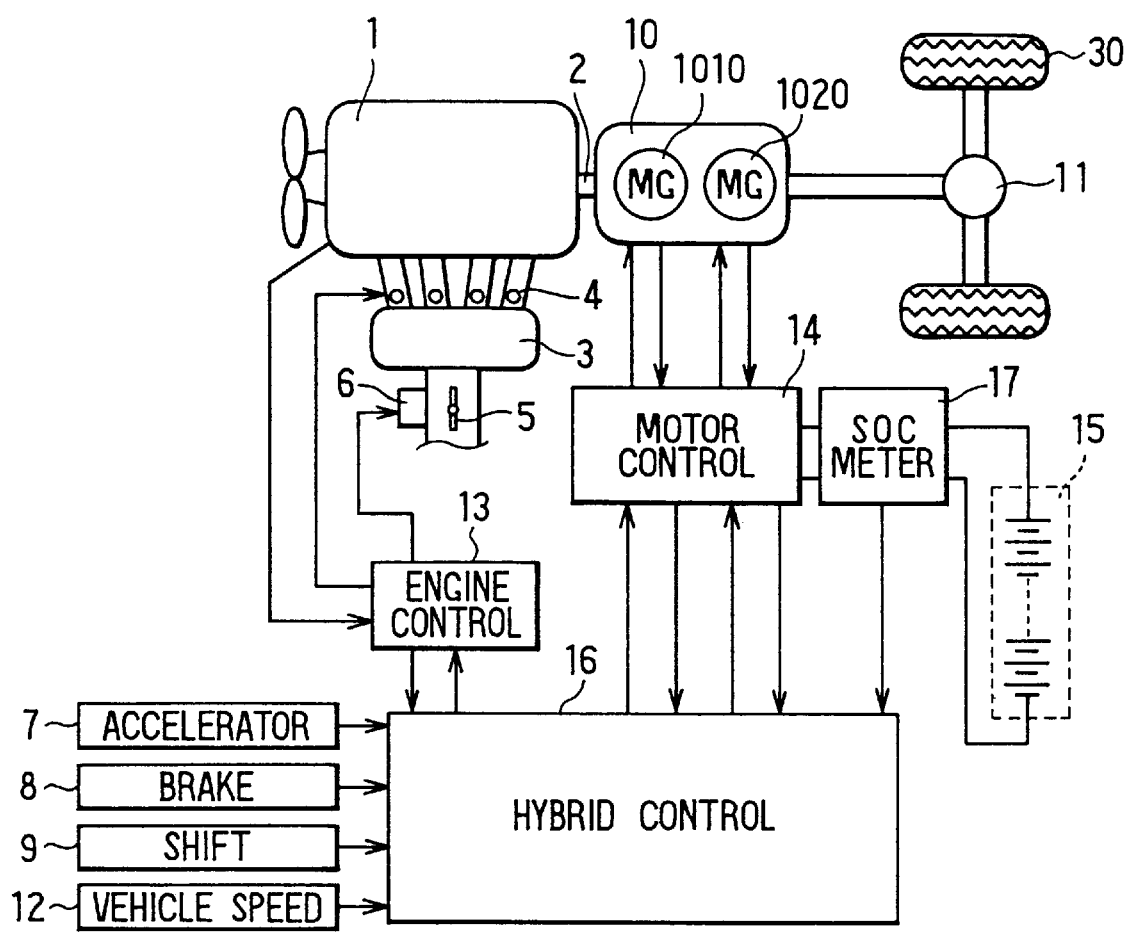
FIG. 1 is a block diagram showing an electronic control apparatus for an engine-motor hybrid vehicle according to a first embodiment of the present invention.
Figure 2:
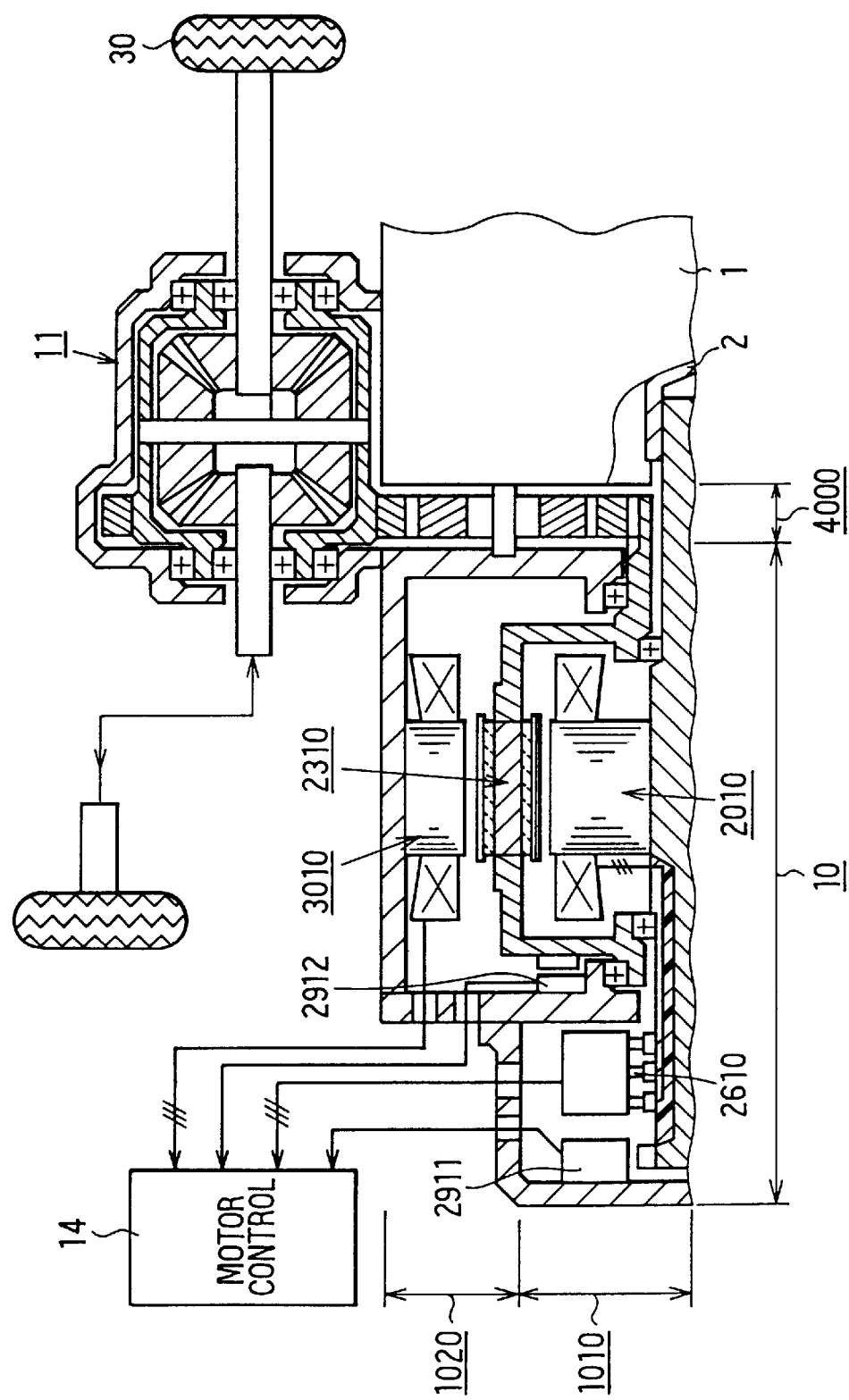
FIG. 2 is a schematic sectional view showing a power transmission device used in the first embodiment of the present invention.

Referring first to FIG. 1, an engine-motor hybrid vehicle has an internal combustion engine 1 having an output shaft 2, an intake pipe 3, a fuel injection valve 4, a throttle valve 5, an intake air amount adjustment device 6 such a throttle control device, an accelerator sensor 7, a brake sensor 8, a shift switch 9, a vehicle speed sensor 12 and a power transmission device 10. The power transmission device 10 includes a first rotary electric machine (electric motor) 1010 and a second rotary electric machine (electric motor) 1020.

The vehicle further has a differential gear 11, driving wheels 30, an internal combustion engine control unit 13, a motor driving control unit 14 for driving the first rotary electric machine 1010 and the second rotary electric machine 1020, an electricity storage device 15 constructed of a storage battery, a hybrid control unit 16, and an SOC meter 17 for measuring the state of charge of the storage device 15.

A control apparatus of the engine-motor hybrid vehicle is constructed of the internal combustion engine control unit 13, the motor driving control unit 14, the hybrid control unit 16, and the SOC meter 17. The internal combustion engine control unit 13 and the hybrid control unit 16 incorporate a microcomputer, respectively.

The first rotary electric machine 1010 is constructed of a brushless DC motor having an inner rotor connected with the output shaft 2 of the internal combustion engine 1 and an outer rotor provided on the periphery of the inner rotor. The inner rotor has a permanent magnet, and the outer rotor has a three-phase coil. Otherwise, the outer rotor has the permanent magnet, and the inner rotor has the three-phase coil. The second rotary electric machine 1020 also is constructed of a brushless DC motor including a rotor having a permanent magnet not shown in FIG. 1 and a stator having the three-phase coil. The rotor of the second rotary electric machine 1020 rotates together with the outer rotor of the first rotary electric machine 1010 or rotates in a mechanical connection therewith. The rotor of the second rotary electric machine 1020 is connected with an output shaft of the through a differential gear 11. For example, it is possible to adopt a coaxial construction, namely, to position the second rotary electric machine 1020 on the periphery of the first rotary electric machine 1010 by locating the stator of the second rotary electric machine 1020 on the periphery of the outer rotor of the first rotary electric machine 1010 serving as the rotor of the second rotary electric machine 1020.

Figure 4:
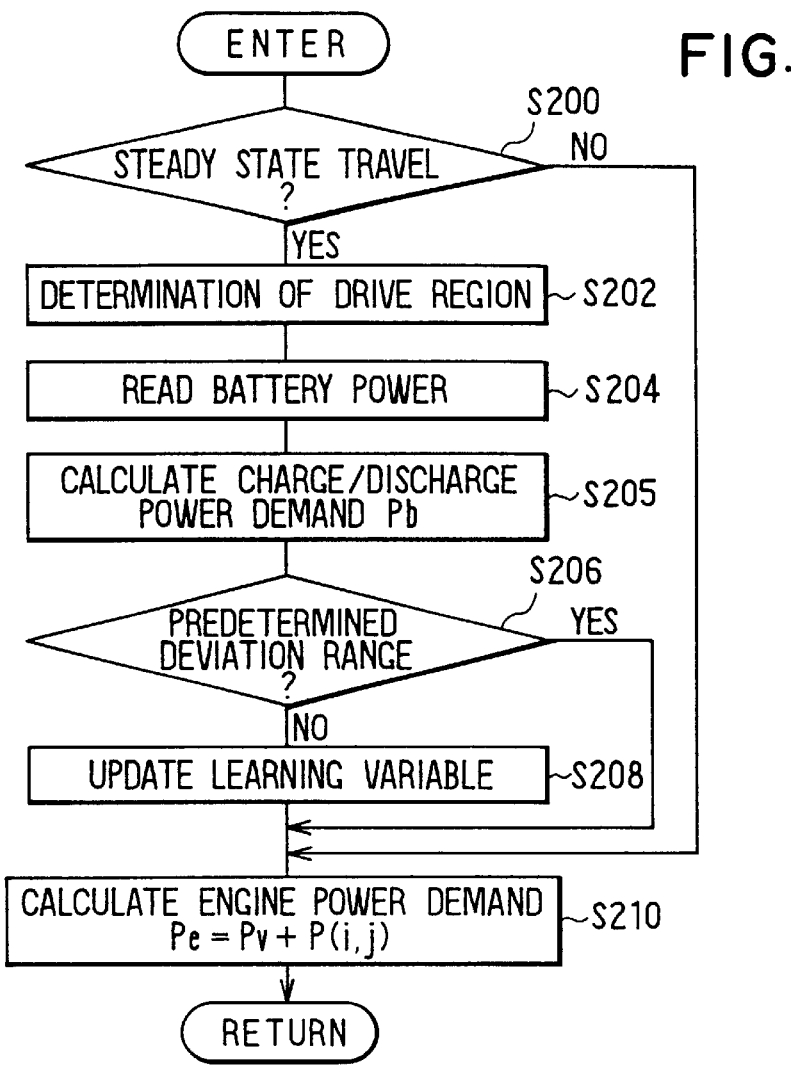
FIG. 4 is a flow diagram showing a calculation processing of an engine power demand value shown in FIG. 3.

Specifically, as shown in FIG. 4, the first rotary electric machine 1010 includes a DC brushless motor having an inner rotor 2010 rotatably held in a housing and connected with the output shaft 2 of the internal combustion engine 1, and an outer rotor 2310 facing the peripheral surface of the inner rotor 2010 and rotatably held in the housing. The inner rotor 2010 has a three-phase armature coil wound thereon. The outer rotor 2310 has a permanent magnet installed on the inner peripheral surface thereof. The motor driving control unit 14 supplies a three-phase alternating voltage to the three-phase armature coil through a slip ring 2610.

The second rotary electric machine 1020 is constructed of a brushless DC motor having a stator 3010 fixed to the inner peripheral surface of the housing and confronting the peripheral surface of the outer rotor 2310, and the outer rotor 2310 of the first rotary electric machine 1020. The motor driving control unit 14 supplies the three-phase alternating voltage to the three-phase armature coil wound on the stator 3010. The outer rotor 2310 is connected with the differential gear 11 through a reduction gear mechanism 4000. A rotational position sensor 2911 for detecting a rotational angular position of the inner rotor 2010 is mounted in the housing, and a rotational position sensor 2912 for detecting a rotational angular position of the outer rotor 2310 is provided also in the housing.

Based on vehicle manipulation information transmitted thereto from the accelerator sensor 7, the brake sensor 8, the shift switch 9, and the vehicle speed sensor 12, the hybrid control unit 16 calculates an engine power demand value and transmits it to the internal combustion engine control unit 13.

The internal combustion engine control unit 13 stores a fuel consumption rate map of the internal combustion engine 1. Based on the received engine power demand value and the fuel consumption rate map, the internal combustion engine control unit 13 determines an engine operation point at which the internal combustion engine 1 has a maximum efficiency in performance, and determines an intake air amount (engine torque demand value) corresponding to the determined engine operation point and an engine speed demand value corresponding thereto. Further, based on the determined intake air amount, the internal combustion engine control unit 13 controls an open degree of the throttle valve 5 and transmits the determined engine speed demand value to the hybrid control unit 16. The internal combustion engine control unit 13 executes a fuel injection control by driving the electronically controlled fuel injection device 4 installed on the internal combustion engine 1 and executes a known ignition control.

Based on the difference between the rotational angular speeds of both rotors of the first rotary electric machine 1010 transmitted thereto from the motor driving control unit 14, the hybrid control unit 16 controls the number of rotations of the first rotary electric machine 1010 to satisfy the received engine speed demand value. That is, the hybrid control unit 16 calculates a torque demand value for the first rotary electric machine 1010 and transmits it to the motor driving control unit 14. The hybrid control unit 16 also calculates a torque demand value for the second rotary electric machine 1020 from the difference between a vehicle driving torque demand value and the torque demand value for the first rotary electric machine 1010 and outputs it to the motor driving control unit 14.

Based on the torque demand value for the first rotary electric machine 1010 and that for the second rotary electric machine 1020 transmitted thereto from the hybrid control unit 16, the motor driving control unit 14 executes a control of electric current in a field direction of both the first and second rotary electric machines 1010 and 1020. The motor driving control unit 14 also executes a control of electric current perpendicular to the field direction to generate a torque in accordance with both torque demand values. Normally, the motor driving control unit 14 detects the number of rotations of the first and second rotary electric machines 1010 and 1020 and transmits them to the hybrid control unit 16. At this time, either the first rotary electric machine 1010 or the second rotary electric machine 1020 performs an electricity generation operation. When the first rotary electric machine 1010 generates an electric power, it supplies the generated electric power to the second rotary electric machine 1020 in operation and vice versa.

Figure 3:
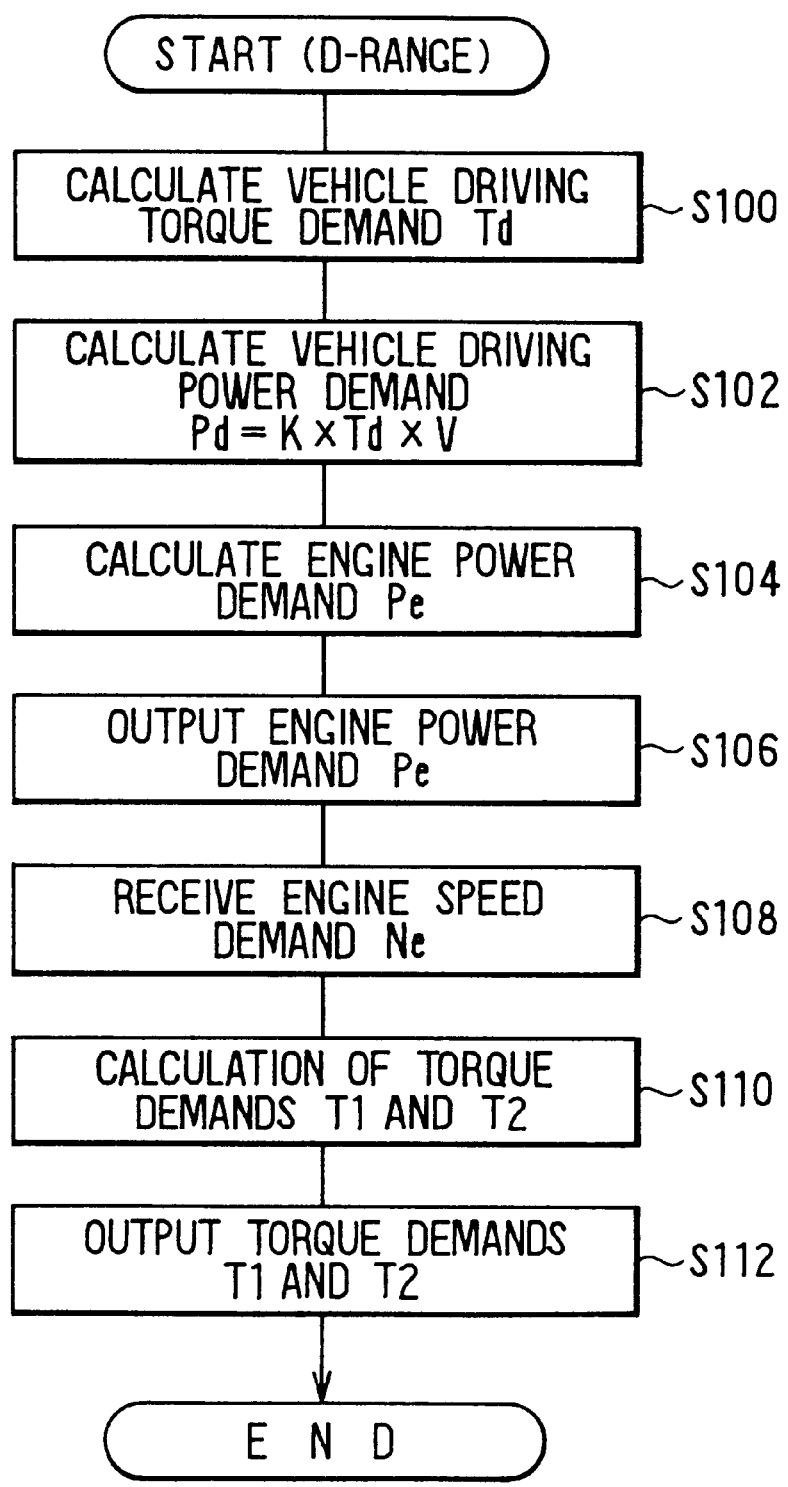
FIG. 3 is a flow diagram showing a control processing of the control apparatus shown in FIG. 1.

The method of controlling the engine constituting the characteristic part of the embodiment will be described below with reference to FIGS. 3 and 4. FIG. 3 is a flow diagram to be executed by the hybrid control unit 16 when the vehicle travels in a rangeD. The flow diagram shows a control operation in the range from a step at which a vehicle driving torque demand value Td is calculated to a step at which a torque demand value T1 for the first rotary electric machine 1010 and a torque demand value T2 for the second rotary electric machine 1020 are calculated.

First, based on a depression stroke of the accelerator transmitted to the hybrid control unit 16 from the accelerator sensor 7, at step S100, the hybrid control unit 16 calculates the vehicle driving torque demand value Td. At step S102, based on the vehicle speed (or number of rotations of output shaft 2 of engine 1) V transmitted to the hybrid control unit 16 from the vehicle speed sensor 12, it calculates a vehicle driving power demand value Pd.

The vehicle driving power demand value Pd is calculated by K·Td·V, where K is a proportional constant.

Then, at step S104, based on the determined vehicle driving power demand value Pd, the hybrid control unit 16 calculates an engine power demand value Pe. This subroutine of step S104 is the characteristic part of the embodiment, the processing to be executed in the subroutine is described in detail below with reference to a flow diagram of FIG. 4.

Initially, at step S200, it is determined whether or not the vehicle travels in a steady state. If NO, because a learning variable should not be updated because of transient operation of the vehicle, the program jumps to step S210 at which the engine power demand value Pe is calculated by using the learning variable P(i,j) used at a previous time.

In the embodiment, whether or not the vehicle travels in the steady state may be determined by whether or not a change in the vehicle driving torque demand value Td and a change in the vehicle speed (or the number of rotations of the output shaft of the engine) V fall within a predetermined range, respectively.

If the vehicle travels in the steady state, a drive region is determined at step S202. The drive region is specified as follows:

The vehicle driving torque demand value Td and the vehicle speed (or the number of rotations of the output shaft of the engine) V are selected as variables representing parameters of the operation state of the vehicle to provide a data map of the driving power demand value Pd from the two variables as dimensions thereof. Accordingly, each point present on the data map indicates the vehicle driving power demand value Pd, namely, a vehicle operation point. For example, the vehicle driving torque demand value Td is divided into eight groups, depending on values thereof. Similarly, the vehicle speed (or the number of rotations of the output shaft of the engine) V is divided into four groups, depending on values thereof to divide the data map into 64 regions.

At step S204, a charge/discharge power of the electricity storage device 15 is read from the SOC meter 17. Then, at step S205, a charge/discharge power demand value Pb of the electricity storage device 15 is calculated according to a remaining capacity thereof read from the SOC meter 17. At step S206, it is determined whether the deviation between the charge/discharge power calculated at step S204 and the charge/discharge power demand value Pb calculated at step S205, that is, imbalance of charge/discharge condition, falls within a predetermined range. If YES, it is determined that the updating of the learning variable is not required. Then, the program jumps to step S210.

If the deviation between the charge/discharge power and the charge/discharge power demand value Pb is outside of the predetermined range, the learning variable P(i,j) corresponding to the drive region determined at step S202 is updated at step S208.

The learning variable P(i,j) to be used in the embodiment is determined by multiplying a predetermined constant by the deviation between the charge/discharge power of the electricity storage device 15 read at step S204 and the charge/discharge power demand value Pb calculated at step S205. The predetermined constant is a coefficient for conversion between the charge/discharge power in the engine and the engine power. Finally at step S210, the engine power demand value Pe is calculated by adding the learning variable P(i,j) to the vehicle driving power demand value Pv.

Then, at step 106, the hybrid control unit 16 transmits the determined engine power demand value Pe to the internal combustion engine control unit 13.

Figure 5:
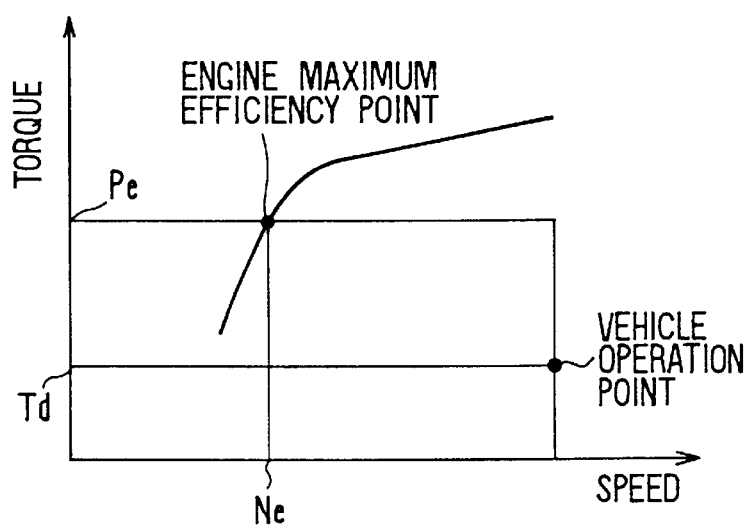
FIG. 5 is a graph showing a performance characteristics of an engine used in the first embodiment.

Based on the received engine power demand value Pe and the fuel consumption rate map, the internal combustion engine control unit 13 determines an engine operation point at which the internal combustion engine 1 has a maximum degree of efficiency (FIG. 5). It also determines an intake air amount (engine torque demand value) corresponding to the engine operation point and an engine speed demand value Ne corresponding thereto. Further, based on the determined intake air amount, the internal combustion engine control unit 13 controls the open degree of the throttle valve 5 and transmits the engine speed demand value Ne to the hybrid control unit 16.

Upon receipt of the engine speed demand value Ne at step S108, the hybrid control unit 16 controls the number of rotations of the first rotary electric machine 1010 to satisfy the received engine speed demand value Ne at step S110. That is, based on the difference between the rotational angular speeds of both rotors of the first rotary electric machine 1010 received from the motor driving control unit 14, the hybrid control unit 16 calculates a torque demand value T1 for the first rotary electric machine 1010. Further, based on the difference between the vehicle driving torque demand value Td and the torque demand value T1 for the first rotary electric machine 1010, the hybrid control unit 16 calculates a torque demand value T2 for the second rotary electric machine 1020. Then, at step S112, the hybrid control unit 16 outputs the determined torque demand values T1 and T2 to the motor driving control unit 14. The motor driving control unit 14 controls the power transmission device 10 to attain the received torque demand values T1 and T2. The above processing is repeated as long as an ignition switch (not shown) is held turned on.

Thus, the charge/discharge power is so controlled that it is zero when the vehicle travels in the steady state. That is, the charge/discharge power detected at step S205 in the steady travel state of the vehicle can be regarded as a deviation of a control amount generated owing to changes of performance characteristics of the engine 1. Using the learning variable P(i,j) for each drive region, the change in the characteristic of the engine with age can be corrected very easily by precisely correcting the engine demand value Pe such that the charge/discharge power becomes zero. The engine will change with age in its characteristic and have a complicated construction. Thus, it is not easy to make an optimum control of the drive of the engine. However, this embodiment is capable of accomplishing the drive of the engine with a high degree of efficiency by a simple control method. In the embodiment, the learning variable P(i,j) in each drive region is set to zero at the start of the drive. However, the learning variable P(i,j) can be set to any desired initial values.

In the first embodiment, the learning variable P(i,j) can be altered or updated to a current value which is obtained by multiplying a currently detected charge/discharge power by the predetermined coefficient. To allow the change in the learning variable P(i,j) to be smooth, it may be updated to an average value of the current and previous values of the learning variable P(i,j) in the same drive region. It is also possible to alter it to a weighted average value of values of a predetermined number of learning variables P(i,j) immediately before the current value of the learning variable P(i,j) in the same drive region.

The two-rotor type rotary electric machine of the power transmission device 10 can be replaced with a type having two rotary electric machines and a planetary gear mechanism.

Second Embodiment

This embodiment is directed to an improvement in the calculation of the engine power demand value. This calculation may be used in the first embodiment.

Figure 6:
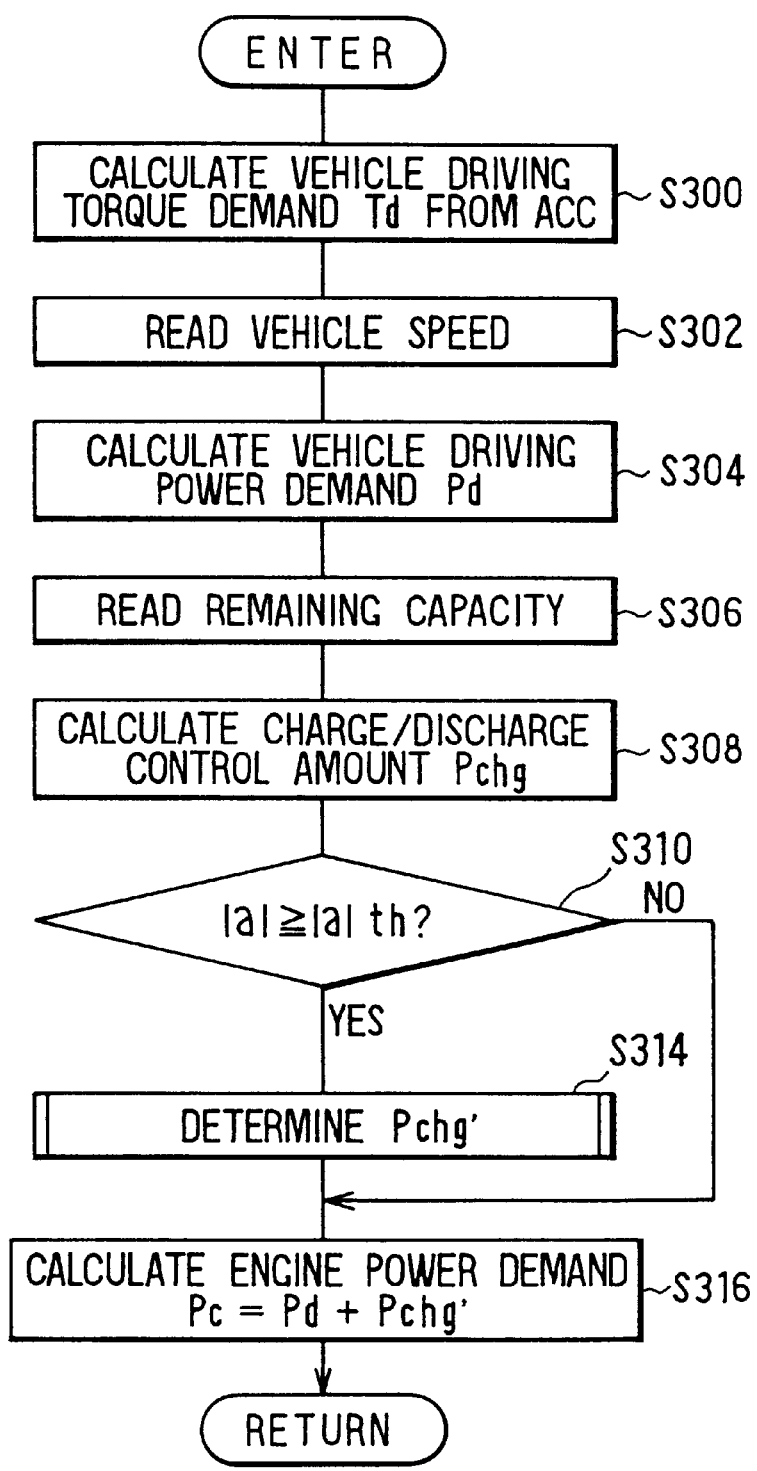
FIG. 6 is a flow diagram showing a calculation processing of an engine power demand value in a second embodiment of the present invention.

Specifically, as shown in FIG. 6, at step S300, based on the depression stroke of the accelerator pedal transmitted to the hybrid control unit 16 from the accelerator sensor 7, the hybrid control unit 16 calculates the vehicle driving torque demand value Td. At step S302, the hybrid control unit 16 reads the vehicle speed (or the number of rotations of the output shaft of the engine) V transmitted thereto from the vehicle speed sensor 12. At step S304, based on the vehicle driving torque demand value Td and the vehicle speed V, the hybrid control unit 16 calculates the vehicle driving power demand value Pd by multiplying the product of the vehicle driving torque demand value Td and the vehicle speed V by a proportional constant.

Figure 9:
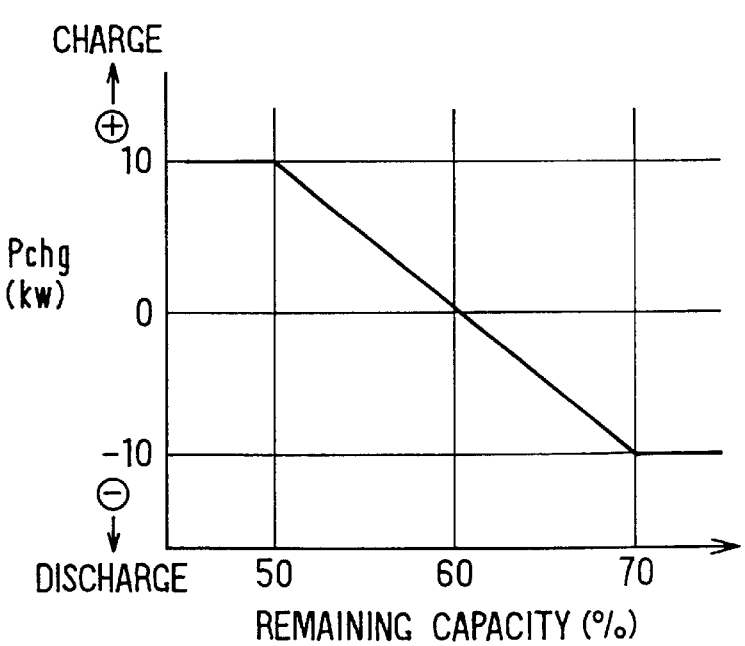
FIG. 9 is a graph showing a relation between a remaining capacity of an electricity storage device and the charge/discharge control amount.

At step S306, the hybrid control unit 16 reads the remaining capacity of the electricity storage device from the SOC meter 17, and based on the remaining capacity, the hybrid control unit 16 calculates a charge/discharge control amount Pchg (equal to charge/discharge power demand value Pb). In the embodiment, the hybrid control unit 16 calculates the charge/discharge control amount Pchg to allow the electricity storage device 15 to always have a predetermined amount of charge and discharge. That is, to allow the remaining capacity to be appropriate, the hybrid control unit 16 executes the following control: If the remaining capacity of the electricity storage device 15 is excessively large, it sets the charge/discharge control amount Pchg to the discharge side, whereas if the remaining capacity of the electricity storage device 15 is excessively small, it sets the charge/discharge control amount Pchg to the charge side. Further, if the remaining capacity is comparatively large although it falls within an appropriate range, the electricity storage device 15 is discharged in a small amount, whereas if the remaining capacity is comparatively small although it falls within the appropriate range, the electricity storage device 15 is charged in a small amount. The charge/discharge control amount Pchg can be determined from a data map of the remaining capacity of the electricity storage device 15 and the charge/discharge control amount Pchg (FIG. 9).

Then, at step S310, the hybrid control unit 16 calculates a variation ΔACC, namely, a change rate a in the depression stroke of the accelerator pedal in a predetermined period of time to examine whether a change in the absolute value |a| of the change rate a in the depression stroke of the accelerator is greater than a predetermined threshold |a| th. The predetermined period of time may be set as the interval of a routine (FIG. 6) which is executed periodically or set as a period longer than the routine interval.

If the change in the absolute value |a| of the change rate a of the depression stroke of the accelerator is greater than the predetermined threshold |a| th, a subroutine S314 for correcting the charge/discharge control amount Pchg is executed to determine a correction charge/discharge control amount Pchg'.

Then, the program proceeds to step S316. If NO at step S310, the program proceeds to step S316.

Figure 7:
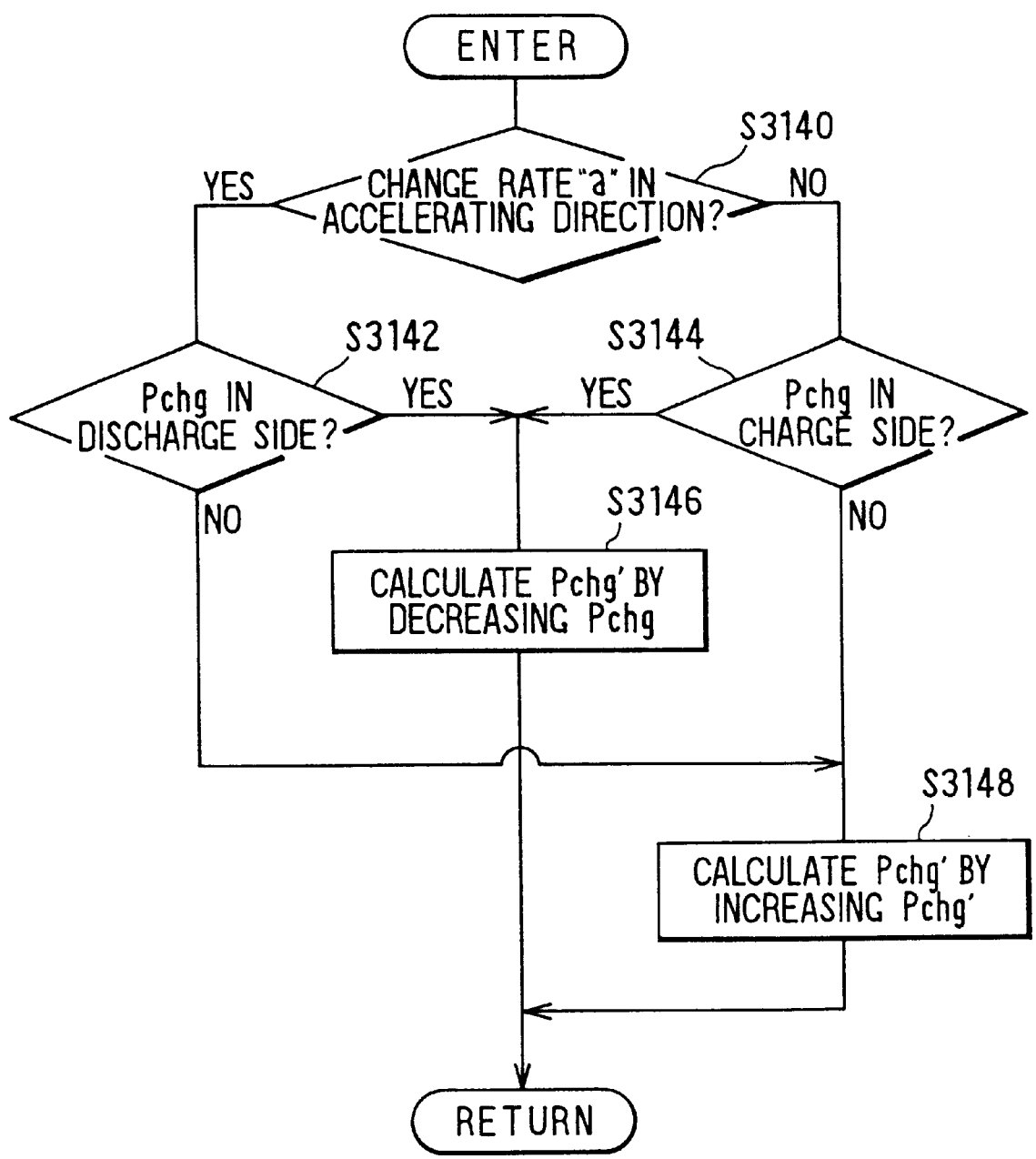
FIG. 7 is a flow diagram showing a calculation processing of a charge/discharge control amount in the processing shown in FIG. 6.

The correction subroutine S314 of the charge/discharge control amount Pchg which is the characteristic part of this embodiment is described in detail below with reference to a flow diagram shown in FIG. 7.

Initially, it is determined at step S3140 whether a change in the change rate a of the depression stroke of the accelerator pedal is in a vehicle-accelerating direction or a vehicle-decelerating direction. If the change in the change rate a is in the vehicle-accelerating direction, it is determined at step S3142 whether the charge/discharge control amount Pchg calculated at step S308 is in a discharge side or a charge side. If the change in the change rate a is in the vehicle-decelerating direction, it is determined at step S3144 whether the charge/discharge control amount Pchg calculated at step S308 is in the charge side or the discharge side.

If it is determined at steps S3140–S3144 that the change in the change rate a is in the vehicle-accelerating direction and that the charge/discharge control amount Pchg calculated at step S308 is in the discharge side, the absolute value of the charge/discharge control amount Pchg is decreased (including the case in which the absolute value thereof is zero) by a predetermined amount to determine the correction charge/discharge control amount Pchg'. If it is determined at steps S3140–S3144 that the change in the change rate a is in the vehicle-decelerating direction and that the charge/discharge control amount Pchg calculated at step S308 is in the charge side, the absolute value of the charge/discharge control amount Pchg is decreased by a predetermined amount to determine the correction charge/discharge control amount PchgI. In both cases, at step S3146, a value determined by the decrease of the charge/discharge control amount Pchg by the predetermined amount is set as the correction charge/discharge control amount Pchg. Then, the program proceeds to step S316.

If it is determined at steps S3140–S3144 that the change in the change rate a is in the vehicle-accelerating direction and that the charge/discharge control amount Pchg calculated at step S308 is in the charge side, the absolute value of the charge/discharge control amount Pchg is increased by a predetermined amount. If it is determined at steps S3140–S3144 that the change in the change rate a is in the vehicle-decelerating direction and that the charge/discharge control amount Pchg calculated at step S308 is in the discharge side, the absolute value of the charge/discharge control amount Pchg is increased by a predetermined amount. In both cases, at step S3148, a value determined by the increase of the charge/discharge control amount Pchg by the predetermined amount is set as the correction charge/discharge control amount Pchg'. Then, the program returns to step S316.

At step S316, the hybrid control unit 16 calculates the engine power demand value Pe by adding the correction charge/discharge control amount Pchg' to the vehicle driving power demand value Pd. Then, the hybrid control unit 16 transmits the determined engine power demand value Pe to the internal combustion engine control unit 13.

The method of controlling each part of the engine, based on the engine power demand value Pe is described below.

Based on the received engine power demand value Pe and the fuel consumption rate map, the internal combustion engine control unit 13 determines an engine operation point at which the internal combustion engine 1 has a maximum degree of efficiency and determines an intake air amount (engine torque demand value Te) corresponding to the engine operation point and an engine speed demand value Ne corresponding thereto. Further, based on the determined intake air amount, the internal combustion engine control unit 13 controls the open degree stroke of the throttle valve and transmits the determined engine speed demand value Ne to the hybrid control unit 16.

The hybrid control unit 16 controls the number of rotations of the first rotary electric machine 1010 to satisfy the received engine speed demand value Ne. That is, based on the difference between the rotational angular speeds of both rotors of the first rotary electric machine 1010 transmitted thereto from the motor driving control unit 14, the hybrid control unit 16 calculates a torque demand value T1 for the first rotary electric machine 1010. The hybrid control unit 16 also calculates a torque demand value T2 for the second rotary electric machine 1020 from the difference between the driving torque demand value Td of the vehicle and the torque demand value T1 for the first rotary electric machine 1010. Then, the hybrid control unit 16 outputs the torque demand values T1 and T2 to the motor driving control unit 14. The motor driving control unit 14 controls electric current to be supplied to the first and second rotary electric machines 1010 and 1020 so that the torque demand values T1 and T2 are generated thereby.

The threshold |a| th is so set at step S310 that the terminal voltage of the electricity storage device 15 is excessively larger than an upper limit value of a predetermined range or excessively smaller than a lower limit value of the predetermined range. By setting the threshold |a| th in this manner, it is possible to obtain the above-described operation and effect.

Although the threshold |a| th is a constant value in the second embodiment, it may be altered to a value appropriately according to the remaining capacity of the electricity storage device and the map.

In the second embodiment, as the variable a indicating the operation state of the vehicle, the hybrid control unit 16 calculates the variation ΔACC of the depression stroke of the accelerator pedal (namely, change rate of pedal stroke of accelerator) in a predetermined period of time. However, the hybrid control unit 16 may modified to calculate a variation ΔPd of the engine power demand value Pe in a predetermined period of time which is calculated at step S304. In this modification, the threshold |a| th is altered to an appropriate value according to the alteration of the variable a.

Figure 8:
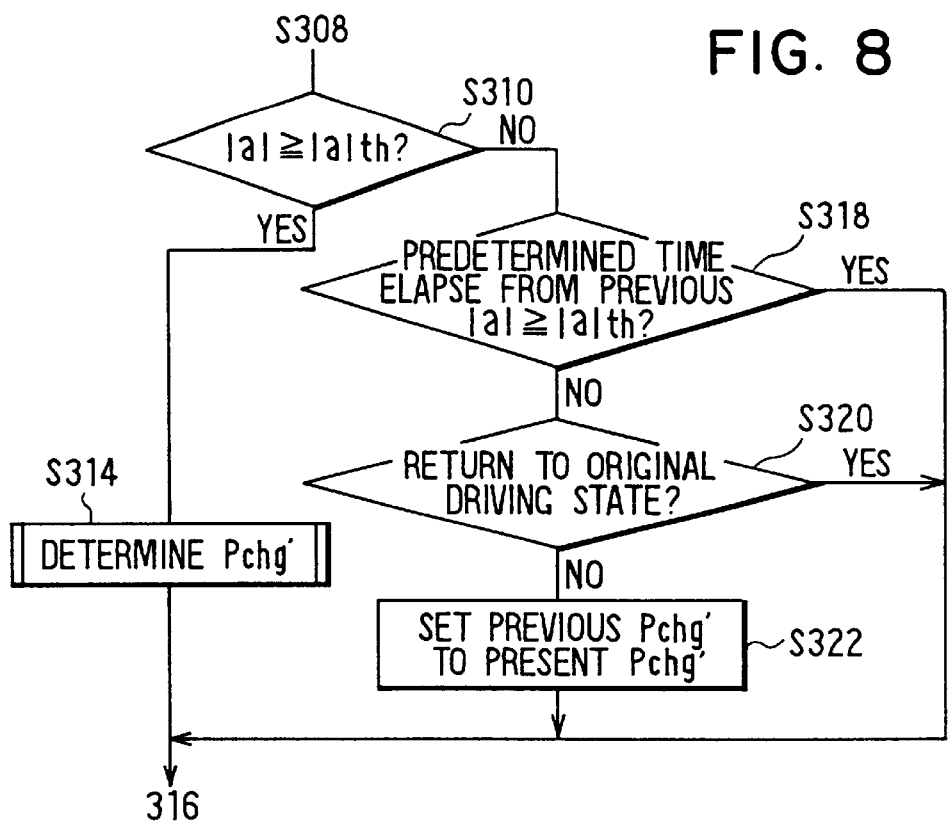
FIG. 8 is a flow diagram showing a calculation processing of an engine power demand value in a modification of the second embodiment.

In another modification shown in FIG. 8, steps S318, S320, and S322 are added to the flow diagram of FIG. 6. Thus, only operations to be executed at steps S318, S320, and S322 are described below.

At step S318, a determination is made as to whether a predetermined period of time t1 has elapsed after it is detected that the absolute value of the variable a indicating the operation state of the vehicle exceeds the threshold |a| th (|a| th≧|a|). If YES, the program proceeds to step S316 without correcting the charge/discharge control amount Pchg. On the other hand, if NO, the program moves to step S320 at which after the detection of |a| th≧|a| is made, whether or not the original operation state of the vehicle has been restored within a predetermined period of time Δt shorter than the predetermined period of time t1. If YES, the program proceeds to step S316 without correcting the charge/discharge control amount Pchg.

If NO at step S320, the program proceeds to step S322 at which the hybrid control unit 16 determines to use a previous correction charge/discharge control amount Pchg' as a current charge/discharge control amount Pchg'. Then, the program proceeds to step S316.

According to the control method of this modification, after termination of the change in the operation state which causes the electricity storage device 15 to have an excess voltage change, alteration of the charge/discharge control amount continues for a predetermined period of time. Thus, after a sudden change in the operation state terminates, it is possible to prevent an electricity storage device voltage from changing excessively due to the influence of the sudden change in the operation state.

Third Embodiment

Figure 10:
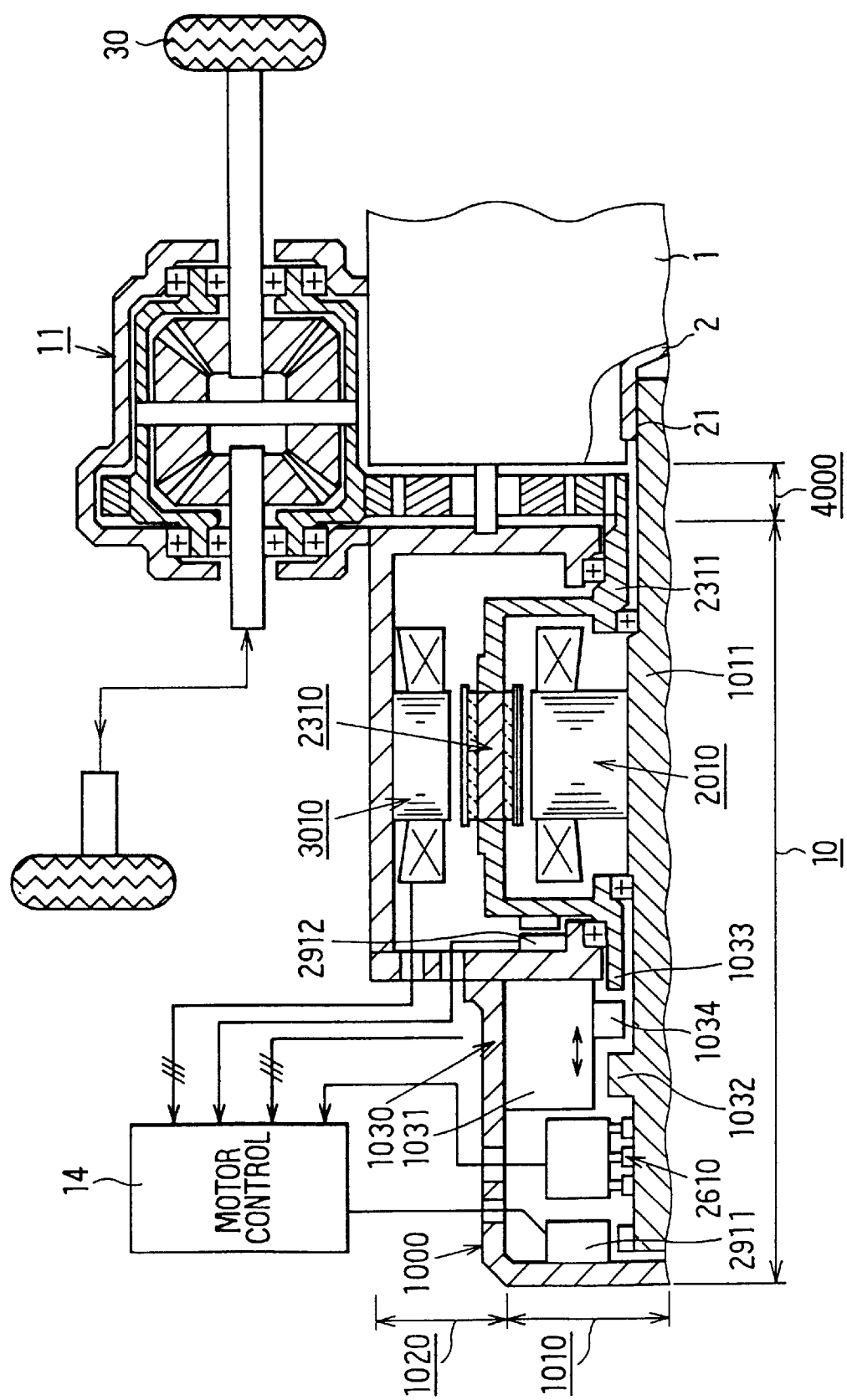
FIG. 10 is a schematic sectional view of a power transmission device used in a third embodiment of the present invention.

This embodiment is directed to an improvement of the power transmission device 10. That is, the power transmission device 10 is provided with a rotation restraining mechanism 1030 as shown in FIG. 10. This improved device 10 may be applied to the first embodiment and the second embodiment.

The rotation restraining mechanism 1030 includes a linear actuator 1031 fixed to the inner peripheral surface of a housing 1000, a ring-shaped input shaft-side engaging part 1032 fixedly fitted on an input shaft 1011 and located radially inward from and proximately to the linear actuator 1031, and an output shaft-side engaging part 1033 located radially inwardly from the linear actuator 1031 and is formed of an axial end part of an output shaft 2311.

The linear actuator 1031 has an operation projection 1034 projecting radially into a gap between the input shaft-side engaging part 1032 and the output shaft-side engaging part 1033 in the axial direction thereof. The input shaft-side engaging part 1032 and the output shaft-side engaging part 1033 have a concave portion (not shown) respectively for locking the operation projection 1034 on an end surface thereof confronting the operation projection 1034. The operation projection 1034 has a convex portion (not shown) engaging the concave portion to thereby restrain a rotation of the input shaft-side engaging part 1032 and that of the output shaft-side engaging part 1033.

The operation projection 1034 is held on a body of the linear actuator 1031 such that it is axially movable. The operation projection 1034 takes the following three positions.

(1) When an electric signal is transmitted from the outside to the linear actuator 1031, the operation projection 1034 is urged toward the input shaft-side engaging part 1032 and shifts to a position at which it locks the input shaft-side engaging part 1032 thereto, thus restraining the rotation of the input shaft 1011.

(2) The operation projection 1034 is urged toward the output shaft-side engaging part 1033 and shifts to a position at which it locks the output shaft-side engaging part 1033, namely, the end face of the output shaft 2311 thereto, thus restraining rotation of the output shaft 2311.

(3) The operation projection 1034 engages neither the input shaft-side engaging part 1032 nor the output shaft-side engaging part 1033, thus not restraining them.

Accordingly, it is possible to select any one of an operation modes of restraining the input shaft 1011, an operation mode of restraining the output shaft 2311, and an operation mode of restraining neither the input shaft 1011 nor the output shaft 2311.

Figure 11:
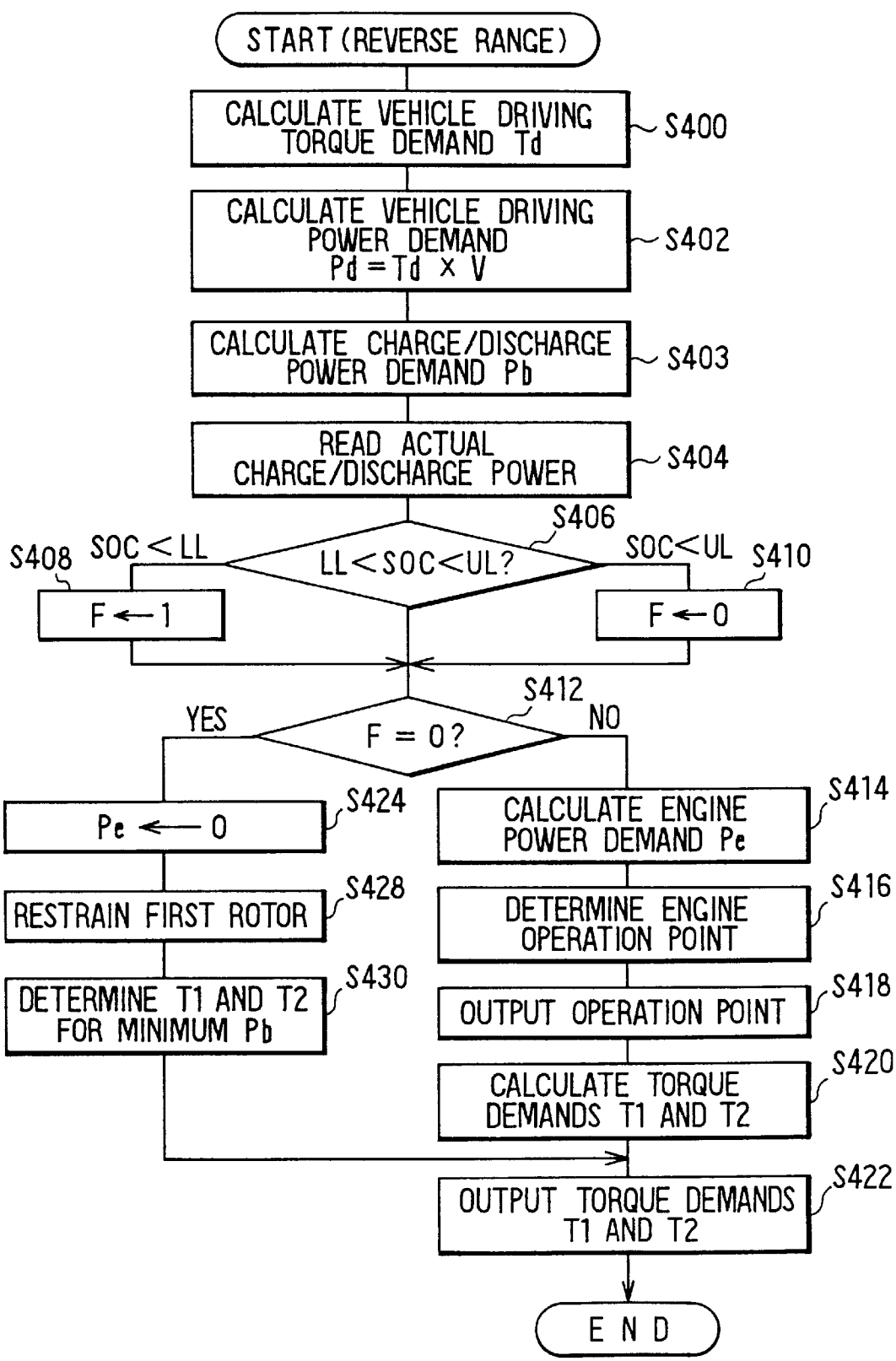
FIG. 11 is a flow diagram showing a control processing of the power transmission device shown in FIG. 10.

The method of controlling the power transmission device 10 at the time of a reverse travel of the vehicle will be described below with reference to a flow diagram of FIG. 11. This flow diagram shows a control operation in the range from a step at which a vehicle driving torque demand value Td is calculated until a step at which the hybrid control unit 16 calculates a torque demand value T1 for the first rotary electric machine 1010 and a torque demand value T2 for the second rotary electric machine 1020.

Initially, at step 400, the hybrid control unit 16 calculates the vehicle driving torque demand value Td based on the depression stroke of the accelerator pedal transmitted thereto from the accelerator sensor 7. At step S402, based on the vehicle driving torque demand value Td and a vehicle speed (or the number of rotations of the output shaft of the power transmission device 10) V transmitted to the hybrid control unit 16 from the vehicle speed sensor 12, it calculates the vehicle driving power demand value Pd. The vehicle driving power demand value Pd is calculated by multiplying a proportional constant by the product of the vehicle driving torque demand value Td and the vehicle speed V.

At step S403, the hybrid control unit 16 reads a remaining capacity of the electricity storage device from the SOC meter 17, and the hybrid control unit 16 determines a charge/discharge power demand value Pb, namely, a charge/discharge power value for the electricity storage device 15 based on the remaining capacity of the electricity storage device 15.

The method of calculating the charge/discharge power demand value Pb based on the remaining capacity of the electricity storage device is described below in detail. The hybrid control unit 16 calculates the charge/discharge power demand value Pb to allow the electricity storage device 15 to always have a predetermined amount of charge and discharge. That is, to allow the remaining capacity of the electricity storage device to be appropriate, the hybrid control unit 16 executes the following control: If the remaining capacity of the electricity storage device is excessively large, the charge/discharge control amount Pchg is set to the discharge side, whereas if the remaining capacity of the electricity storage device is excessively small, the charge/discharge power demand value Pb is set to the charge side. Further, if the remaining capacity of the electricity storage device 15 is comparatively large although it falls within an appropriate range, the electricity storage device 15 is discharged in a small amount, whereas if the remaining capacity of the electricity storage device is comparatively small although it falls within the appropriate range, the electricity storage device 15 is charged in a small amount. The charge/discharge power demand value Pb can be determined from a data map of the remaining capacity of the electricity storage device 15 and the charge/discharge power demand value Pb.

Then, at step S404, the hybrid control unit 16 reads an actual charge/discharge power. At the following step S406, the remaining capacity of the electricity storage device 15 read from the SOC meter 17 is compared with a predetermined lower limit value LL as well as a predetermined upper limit value UL greater than the lower limit value LL by more than a predetermined value. If the remaining capacity of the electricity storage device 15 is less than the lower limit value LL, a flag F is set to 1 at step S408. If the remaining capacity of the electricity storage device 15 is more than the upper limit value UL, the flag F is set to 0 at step S410. Then, it is determined at step S412 whether the flag F is 1. If YES, the program proceeds to step S414. If NO, the program proceeds to step S424.

At step S414, the engine power demand value Pe is calculated from an equation Pe=Pd+Pb. Then, at step S416, based on a map, the hybrid control unit 16 determines an engine operation point at which the engine power demand value Pe is outputted with maximum engine efficiency.

Then, at step S418, the hybrid control unit 16 transmits the determined engine operation point to the internal combustion engine control unit 13. The internal combustion engine control unit 13 determines an intake air amount corresponding to the engine operation point and controls the open degree of the throttle valve based on the determined intake air amount.

At step S420, upon receipt of the engine speed demand value, the hybrid control unit 16 controls the number of rotations of the first rotary electric machine 1010 to satisfy the received the engine speed demand value. That is, based on the difference between the rotational angular speeds of both rotors of the first rotary electric machine 1010 received from the motor control unit 14, the hybrid control unit 16 calculates a torque demand value T1 for the first rotary electric machine 1010. Further, based on the difference between the vehicle driving torque demand value Td and the torque demand value T1 for the first rotary electric machine 1010, the hybrid control unit 16 calculates a torque demand value T2 for the second rotary electric machine 1020. Then, at step S422, the hybrid control unit 16 outputs the determined torque demand values T1 and T2 to the motor driving control unit 14.

If the flag F is set to 1 at step S412, the engine power demand value Pe is set to 0 to demand a stop of the engine 1. Then, at step S428, the rotation restraining mechanism 1030 is operated to restrain a rotation of the first rotor 2010. The rotation of the first rotor 2010 may be restrained at step S428 a predetermined period of time after an instruction of setting the engine power demand value Pe to 0 is issued at step S424.

Then, at step S430, the hybrid control unit 16 calculates the torque demand value T1 for the first rotary electric machine 1010 and the torque demand value T2 for the second rotary electric machine 1020 in such a manner that the charge/discharge power to be detected at step S404 is minimum. At step S422, the hybrid control unit 16 outputs the torque demand values T1 and T2 to the motor driving control unit 14.

According to the control method, it is possible to so distribute the vehicle driving torque demand value Td (=T1, T2) to the first and second rotary electric machines 1010 and 1020 as to minimize the loss of the power transmission device 10. That is, the control method allows the vehicle driving torque demand value Td to be distributed at the most efficient rate.

More specifically, in step S430, by dividing a current value of the charge/discharge power by the vehicle driving torque demand value Td, the hybrid control unit 16 calculates a unit charge/discharge power ΔPb which is the charge/discharge power of the vehicle driving torque demand value Td per unit amount ΔTd, and then stores the unit charge/discharge power ΔPb.

Then, the hybrid control unit 16 compares the current value of the unit charge/discharge power ΔPb and a previous value thereof with each other. If the current value is smaller than the previous value, the hybrid control unit 16 determines that the efficiency has been improved and currently alters a torque distribution rate in a predetermined amount in a change direction of a torque distribution from two times before the current time to the previous time. If the current value is greater than the previous value, the hybrid control unit 16 determines that the efficiency has lessened and currently alters the torque distribution rate in a predetermined amount in the direction opposite to the change direction of the torque distribution from two times before the current time to the previous time. The torque distribution rate means the distribution rate between the torque demand value T1 and the torque demand value T2 in the vehicle driving torque demand value Td.

According to this control, when the vehicle moves in reverse, the distribution of the outputs of the first and second rotary electric machines 1010 and 1020 can be so made as to minimize the loss of the power transmission device 10. That is, the control method allows the power transmission device 10 to operate efficiently.

Other than the above-described method of determining an optimum torque distribution rate which is carried out by way of trial and error, it is possible to set a torque distribution rate based on the relationship between a stored torque distribution rate and various operation conditions.

At the time of parking, the linear actuator 1031 is driven to restrain the rotation of the second rotor 2310 of the first rotary electric machine 1010 to achieve the effect of a parking brake.

Figure 12:
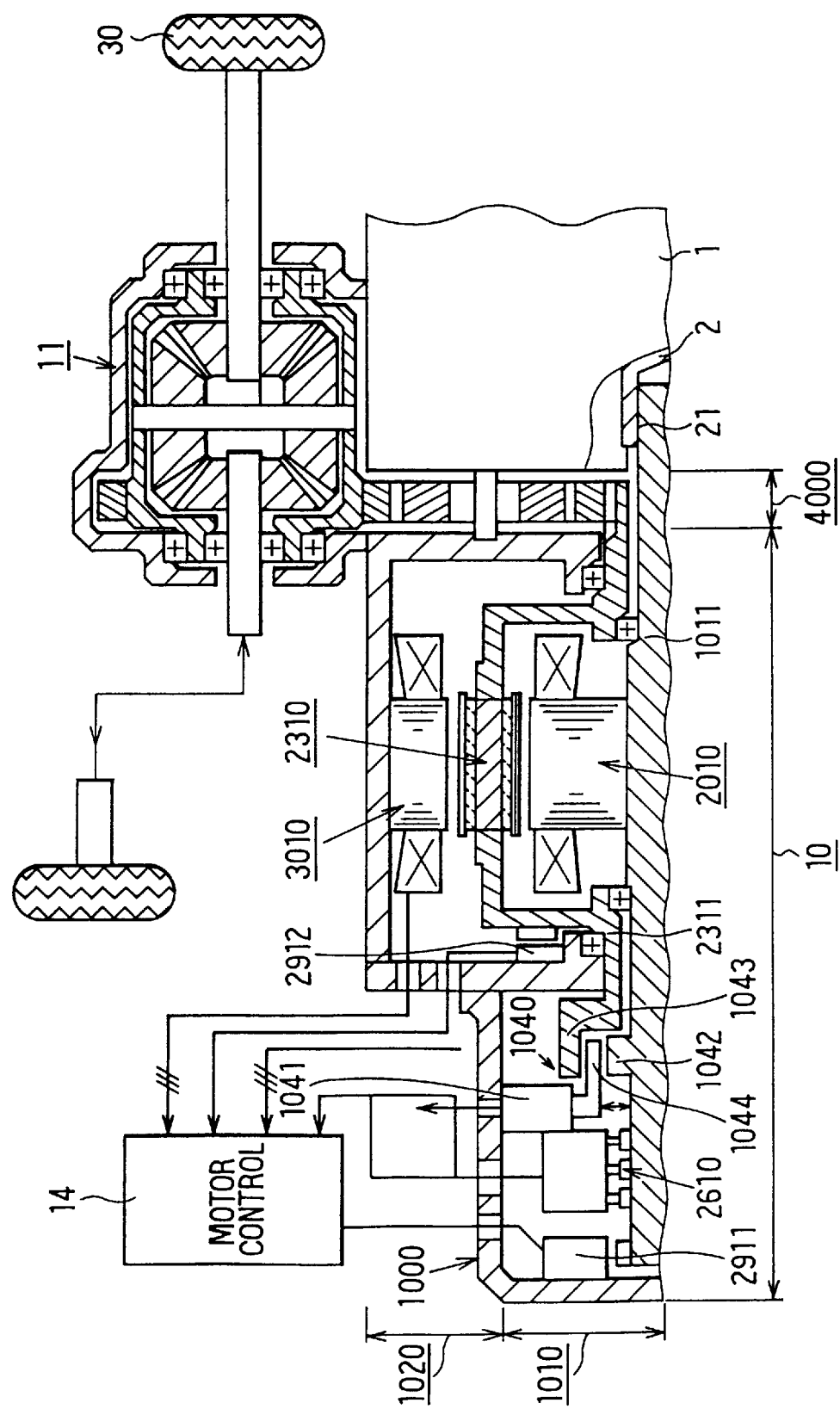
FIG. 12 is a schematic sectional view of a power transmission device used in a modification of the third embodiment.

The third embodiment may be modified as shown in FIG. 12. In this modification, a rotation restraining mechanism 1040 is used in place of the rotation restraining mechanism 1031 shown in FIG. 10.

Specifically, the rotation restraining mechanism 1040 includes a linear actuator 1041 fixed to an inner peripheral surface of the housing 1000, a ring-shaped input shaft-side engaging part 1042 fixedly fitted into the input shaft 1011 and located radially inward from and proximately to the linear actuator 1041, an output shaft-side engaging part 1043 constructed of an end part of a cylindrical output shaft 2311 and positioned radially outwardly from the input shaft-side engaging part 1042 with a predetermined gap provided between the output shaft-side engaging part 1043 and the input shaft-side engaging part 1042 in the radial direction thereof, such that the output shaft-side engaging part 1043 covers the input shaft-side engaging part 1042, and an operation bar 1044 positioned in the gap between the output shaft-side engaging part 1043 and the input shaft-side engaging part 1042 in the radial direction thereof.

A peripheral surface of the input shaft-side engaging part 1042 and an inner peripheral surface of the output shaft-side engaging part 1043 have a concave portion (not shown), respectively for locking the operation bar 1044 thereto. The operation bar 1044 has convex portions (not shown) each engaging each of the concave portions to thereby prevent the rotation of the input shaft-side engaging part 1042 and the output shaft-side engaging part 1043. The operation end of the operation bar 1044 shifts linearly radially outwardly and engages the concave portion of the output shaft-side engaging part 1043. The operation end of the operation bar 1044 shifts linearly radially inwardly and engages the concave portion of the input shaft-side engaging part 1042.

A drive end of the operation bar 1044 is fixed to an operation convexity of the linear actuator 1041 movable in the radial direction thereof. The drive end of the operation bar 1044 takes the following three positions when an electric signal is transmitted from the outside to the linear actuator 1041.

(1) The drive end is urged toward the input shaft-side engaging part 1042 and shifts to a position at which it locks the input shaft-side engaging part 1042 thereto, thus restraining the rotation of the input shaft 1011.

(2) The drive end is urged toward the output shaft-side engaging part 1043 and shifts to a position at which it locks the output shaft-side engaging part 1043 thereto, thus restraining the rotation of the output shaft 2311.

(3) The drive end engages neither the input shaft-side engaging part 1042 nor the output shaft-side engaging part 1043, thus not restraining them.

Accordingly, it is possible to select any one of an operation mode of restraining the input shaft 1011, an operation mode of restraining the output shaft 2311, and an operation mode of restraining neither the input shaft 1011 nor the output shaft 2311.

Figure 13:
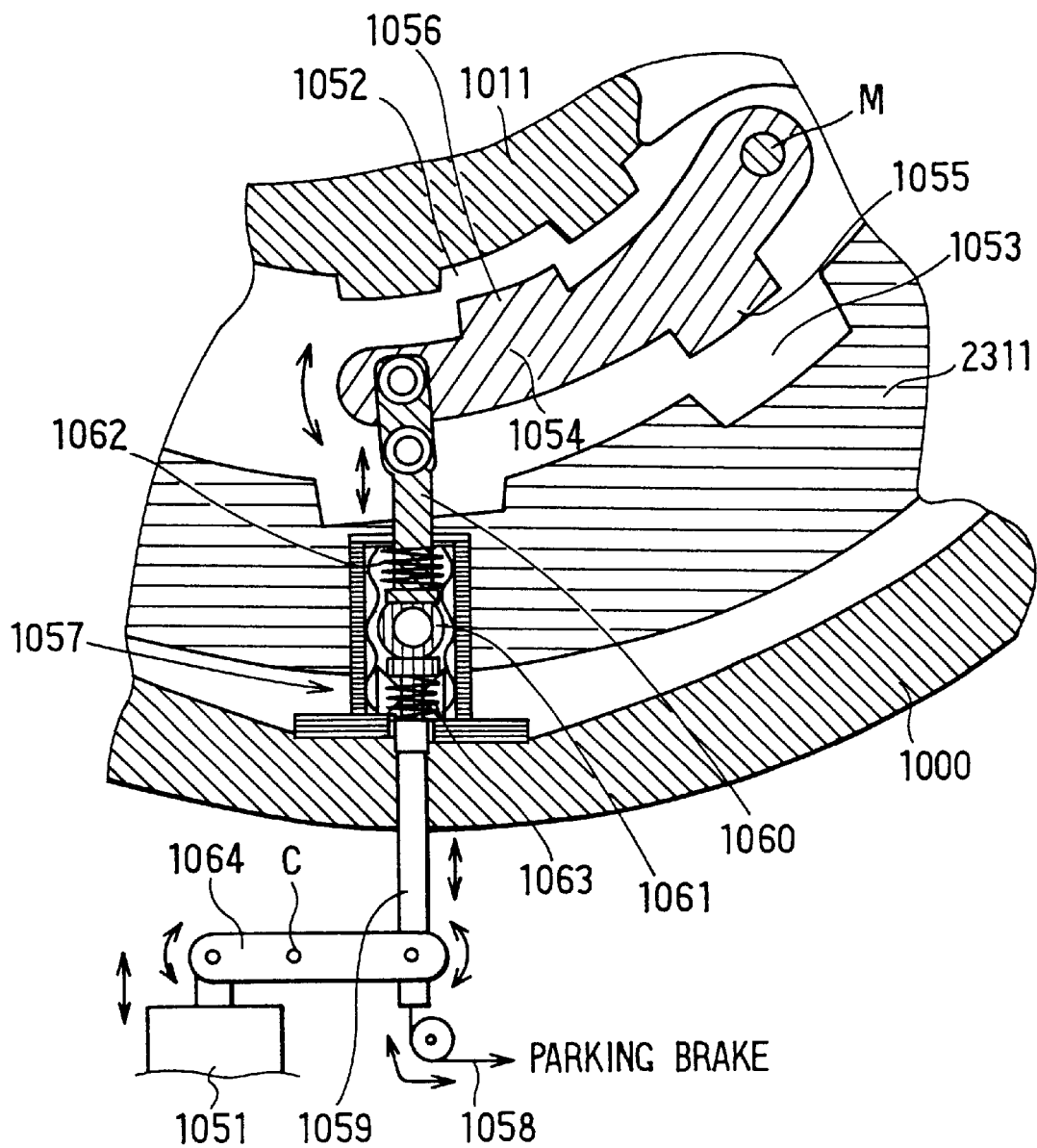
FIG. 13 is a schematic sectional view of a power transmission device used in another modification of the third embodiment.

In another modification of the third embodiment, a rotation restraining mechanism is differentiated as shown in FIG. 13.

The rotation restraining mechanism includes a link mechanism 1050, a linear actuator 1051 (linear solenoid), an input shaft-side engaging part 1052 formed concavely on an inner peripheral surface of the input shaft 1011, an output shaft-side engaging part 1053 formed concavely on an inner peripheral surface of an output shaft 2311 and so positioned as to cover the input shaft-side engaging part 1042, and an operation bar 1054 supported on the housing 1000 such that it is pivotal on a point M and positioned in the gap between the input shaft-side engaging part 1052 and the output shaft-side engaging part 1053 in the radial direction thereof. The operation bar 1054 has engaging projection portions 1055 and 1056 formed thereon. The operation bar 1054 pivots radially outwardly and engages the output shaft-side engaging part 1053. The operation bar 1054 pivots radially inwardly and engages the input shaft-side engaging part 1052.

A drive end of the operation bar 1054 is connected with an operation projection of the linear actuator 1051 through a spring cylinder 1057 and also with a parking brake lever (not shown) through the spring cylinder 1057 and a wire 1058.

The spring cylinder 1057 has an input rod 1059, an output rod 1060, a pin 1061 having a large diameter, and springs 1062 and 1063. The spring 1062 urges the pin 1061 downward in the figure, whereas the spring 1063 urges the pin 1061 upward in the figure. In this construction, when the input rod 1059, the output rod 1060, and the pin 1061 are not urged by the wire 1058 and the linear actuator 10511, they are located at a center position at which the springs 1062 and 1063 balance with each other. In this state, the operation bar 1054 engages neither the input shaft-side engaging part 1052 nor the output shaft-side engaging part 1053, thus restraining neither the rotation of the input shaft 1011 nor that of the output shaft 2311.

When the linear actuator 1051 is energized with electric current under the control of the hybrid control unit 16 in a reverse movement of the vehicle, the operation projection of the linear actuator 1051 pivots a link 1064 on a point C. As a result, the input rod 1059 shifts upward and the operation lever 1054 engages the output shaft-side engaging part 1053. Consequently, the rotation of the output shaft 2311 is restrained.

When a braking lever (not shown) is pulled, the wire 1058 shifts the input rod 1059 downward. As a result, the operation lever 1054 engages the input shaft-side engaging part 1052. Consequently, the rotation of the input shaft 1011 is restrained, and a parking braking function works.

It is possible to replace each of the linear actuator 1031 shown in FIG. 10 and the linear actuator 1041 shown in FIG. 12 with the linear actuator 1051 and the wire 1058 shown in FIG. 13.

What is claimed is:

1. A control apparatus for an engine-motor hybrid vehicle having an engine for generating an engine power, a power transmission device including a rotary electric machine converting the engine power into an electric power to generate a driving power of the vehicle, and an electricity storage device for supplying the electric power to the rotary electric machine and receiving the electric power therefrom, the control apparatus determining an engine power demand value to be generated by the engine based on a vehicle driving power demand value for driving the vehicle and a charge/discharge power demand value for charging and discharging the electricity storage device, and controlling the engine power based on the engine power demand value, the control apparatus comprising:

means for setting a learning variable for each of operation regions of the vehicle, the operation regions being specified by a plurality of operation state variables representing respective operation state parameters of the vehicle;

means for determining a power state amount indicating a predetermined power state of the engine including a charge/discharge power when a predetermined operation condition establishes, and updating the learning variable of the operation region selected according to a value of the operation state variable, based on the power state amount;

means for correcting the engine power demand value based on the learning variable; and means for controlling the engine power based on the corrected engine power demand value.

2. A control apparatus according to claim 1, wherein the operation state variable includes a vehicle driving torque and at least one of a vehicle speed and a number of rotations of an output shaft of the engine.

3. A control apparatus according to claim 1, wherein the learning variable is updated to a value intermediate between a previously updated value thereof and a current value thereof determined according to the power state amount, each time the predetermined operation condition establishes.

4. A control apparatus according to claim 1, wherein the predetermined operation condition is an operation state in which a variation of a predetermined state amount associated with any one of a vehicle driving torque demand value, the vehicle driving power demand value, and the engine power demand value continues within a predetermined range for a predetermined period of time.

5. A control apparatus according to claim 1, wherein the power state amount includes a deviation between the charge/discharge power demand value and an actual charge/discharge power of the electricity storage device.

6. A control apparatus for an engine-motor hybrid vehicle having an engine, a power transmission device including a first rotary electric machine connected with an output shaft of the engine and determining a number of rotations of the engine and a second rotary electric machine connected with an output shaft of the vehicle and determining a driving force of the vehicle, and an electricity storage device for supplying an electric power to the first and second rotary electric machines and receiving the electric power therefrom, the control apparatus comprising:

means for calculating a vehicle driving torque demand value based on information of operation of an accelerator pedal, a braking pedal, and a shift lever;

means for calculating a vehicle driving power demand value based on the vehicle driving torque demand value and a vehicle speed;

means for calculating a charge/discharge power demand value based on a storage state of the electricity storage device;

means for calculating an engine power demand value based on the vehicle driving power demand value and the charge/discharge power demand value;

means for calculating an engine speed demand value based on the engine power demand value and a stored characteristic of the engine;

means for calculating a first torque demand value to be generated by the first rotary electric machine based on the engine speed demand value;

means for calculating a second torque demand value to be generated by the second rotary electric machine based on the first torque demand value and the vehicle driving torque demand value;

means for controlling the first and second rotary electric machines, based on the first and second torque demand values, respectively;

means for setting a learning variable learnable for each of the operation regions, the operation regions being specified by an operation state variable including the vehicle driving torque and at least one of the vehicle speed and the number of rotations of the output shaft of the engine;

means for determining a power state amount indicating a predetermined power state of the engine including a charge/discharge power when a predetermined vehicle operation condition regarded as a steady operation state establishes, and updating the learning variable of the operation region selected according to a value of the operation state variable, based on the power state amount;

means for correcting the engine power demand value or the vehicle driving power demand value based on the learning variable; and means for controlling the engine power based on the corrected engine power demand value.

7. A control method for an engine-motor hybrid vehicle having an engine, a power transmission device including an electric motor connected between the engine and wheels, and a storage electricity storage device for supplying an electric power to the motor and receiving the electric power therefrom, the control method comprising the steps of:

detecting whether a vehicle is traveling under a predetermined steady state;

detecting an imbalance of charge and discharge of the storage electricity storage device;

detecting a lessening of an engine performance from a maximum performance efficiency point when the detected imbalance is outside of a predetermined range; and changing an engine control based on a detection result of the lessening detecting step.

8. A control method according to claim 7, wherein the changing step includes:

calculating an engine control correction value when the predetermined steady state and the lessening are detected; and controlling the engine based on predetermined control parameters including the calculated engine control correction value thereby to operate the engine at the maximum performance efficiency point.

9. A control method according to claim 8, wherein the engine control correction value is updated to reduce the imbalance of charge and discharge of the storage electricity storage device.

10. A control method according to claim 9, wherein the engine control correction value is provided for each of a plurality of operation areas of the vehicle.

11. A control apparatus for an engine-motor hybrid vehicle having an engine, a power transmission device including a rotary electric machine converting at least a part of the engine power thereof into an electric power and generating at one part of a driving power of the vehicle, and an electricity storage device for supplying an electric power to the rotary electric machine and receiving the electric power therefrom, the control apparatus comprising:

means for detecting operation state data of the vehicle;

means for determining a vehicle driving power demand value for driving the vehicle based on the operation state data;

means for detecting remaining capacity data of a remaining capacity of the electricity storage device;

means for determining charge and discharge control amounts of the electricity storage device such that the remaining capacity of the electricity storage device falls within a predetermined range based on the remaining capacity data;

means for controlling the engine to generate an engine power satisfying the vehicle driving power demand value and the charge and discharge control amounts; and means for altering charge and discharge control amounts in a direction in which a voltage change is restrained, when the operation state changes in such a manner that an excess voltage change occurs in the electricity storage device.

12. A control apparatus according to claim 11, wherein the excess voltage change is caused to occur in the electricity storage device when a depression stroke of an accelerator changes.

13. A control apparatus according to claim 11, wherein the excess voltage change is caused to occur in the electricity storage device when the vehicle driving power demand value changes.

14. A control apparatus according to claim 11, wherein the altering means decreases the absolute value of the charge/discharge control amount, when a change in the operation state is in a vehicle-accelerating direction and that the charge/discharge control amount is in a discharge side, or when a change in the operation state is in a vehicle-decelerating direction and that the charge/discharge control amount is in a charge side.

15. A control apparatus according to claim 11, wherein the altering means increases the absolute value of the charge/discharge control amount, when a change in the operation state is in a vehicle-accelerating direction and that the charge/discharge control amount is in a charge side, or when a change in the operation state is in a vehicle-decelerating direction and that the charge/discharge control amount is in a discharge side.

16. A control apparatus according to claim 11, wherein the altering means continues alteration of the charge and discharge control amounts for a predetermined period of time after detecting the operation state change which causes an excessive voltage change in the electricity storage device.

17. A control apparatus according to claim 11, wherein the altering means continues alteration of the charge and discharge control amounts for a predetermined period of time after termination of the operation state change which causes an excessive voltage change in the electricity storage device.

18. A control apparatus for an engine-motor hybrid vehicle comprising:

an engine having an output shaft;

an electricity storage device;

a power transmission device for transmitting an energy between the engine and the electricity storage device as well as a drive shaft of the vehicle, the power transmission device having an input shaft and an output shaft; and an electronic control unit for controlling the power transmission device, wherein the power transmission device includes:

a first rotary electric machine having a first rotor mechanically connected with the output shaft of the engine through the input shaft of the power transmission device, and a second rotor connected with the first rotor such that an electromagnetic energy is transmitted between the second rotor and the first rotor and mechanically connected with the output shaft of the power transmission device, the first rotary electric machine transmitting an energy between the engine and the electricity storage device;

a second rotary electric machine having a rotor mechanically connected with the output shaft of the power transmission device and transmitting an electromagnetic energy between the electricity storage device and the output shaft of the power transmission device;

a connection mechanism connecting the output shaft of the engine with the input shaft of the power transmission device while allowing a slight relative rotary motion; and a rotation restraining mechanism restraining the input shaft of the power transmission device.

19. A control apparatus according to claim 18, wherein the rotation restraining mechanism has a first restraining position at which the first rotor of the first rotary electric machine is restrained, a second restraining position at which the second rotor of the first rotary electric machine is restrained, and an unrestrained position at which the first and second rotors of the first rotary electric machine are not restrained.

20. A control apparatus for an engine-motor hybrid vehicle comprising:

an engine having an output shaft;

an electricity storage device;

a power transmission device for transmitting an energy between the engine and the electricity storage device as well as a drive shaft of the vehicle, the power transmission device having an input shaft and an output shaft; and an electronic control unit for controlling the power transmission device, wherein the power transmission device includes:
- a first rotary electric machine having a first rotor mechanically connected with the output shaft of the engine through the input shaft of the power transmission device; and
- a second rotor connected with the first rotor such that an electromagnetic energy is transmitted between the second rotor and the first rotor and mechanically connected with the output shaft of the power transmission device, the first rotary electric machine transmitting an energy between the engine and the electricity storage device;
- a second rotary electric machine having a rotor mechanically connected with the output shaft of the power transmission device and transmitting an electromagnetic energy between the electricity storage device and the output shaft of the power transmission device; and
- a rotation restraining mechanism fixing the output shaft of the engine or the input shaft of the power transmission device unrotatably, and wherein the control unit restrains the output shaft of the engine or the input shaft of the power transmission device unrotatably by driving the rotation restraining mechanism when the vehicle moves in reverse.

21. A control apparatus according to claim 20, wherein the rotation restraining mechanism restrains the input shaft of the power transmission device.

22. A control apparatus according to claim 20, wherein the control unit releases the restraint although the vehicle is moving in reverse, when a remaining capacity of the electricity storage device is less than a predetermined lower limit value.

23. A control apparatus according to claim 22, wherein the control unit restores the restraint after the restraint is released, when the remaining capacity of the electricity storage device reaches an upper limit value greater than the lower limit value by more than a predetermined value while the vehicle is moving in reverse.

24. A control apparatus according to claim 20, wherein the control unit distributes outputs of the first and second rotary electric machines such that loss of the power transmission device is minimum, when the vehicle moves reverse.

25. A control apparatus according to claim 24, wherein the control unit determines loss of the power transmission device based on a charge/discharge power of the electricity storage device.

26. A control apparatus according to claim 20, wherein the control unit distributes the outputs of the first and second rotary electric machines such that loss of the power transmission device is minimum, based on a speed of the vehicle and a vehicle driving torque, when the vehicle is moving in reverse.

* * * * *